United States Patent [19]

Satija et al.

[11] Patent Number: 5,462,709
[45] Date of Patent: Oct. 31, 1995

[54] PROCESS FOR COLORING THERMOPLASTICS

[75] Inventors: Sunil Satija, Holland; Daniel M. Wade, Lansdale, both of Pa.; Ronald C. Reynolds, Louisville, Ky.

[73] Assignee: Atohaas B.V., Haarlem, Netherlands

[21] Appl. No.: 371,055

[22] Filed: Jan. 10, 1995

Related U.S. Application Data

[63] Continuation of Ser. No. 145,262, Oct. 29, 1993, abandoned.

[51] Int. Cl.$^6$ .......................... B29C 45/46; B29C 47/36
[52] U.S. Cl. ................ 264/211; 264/328.18; 264/349; 523/351
[58] Field of Search ................... 264/73, 75, 245, 264/349, 328.17, 328.18, 5, 13, 78, 77, 211; 523/351; 425/131.1, 132

[56] References Cited

U.S. PATENT DOCUMENTS

| | | | |
|---|---|---|---|
| 2,136,450 | 11/1938 | Marks | 264/78 |
| 3,562,379 | 2/1971 | Duggins | 264/245 |
| 4,065,532 | 12/1977 | Wild et al. | 264/68 |
| 4,125,582 | 11/1978 | Langlois | 264/73 |
| 4,246,374 | 1/1981 | Kopchik | 525/329 |
| 4,259,277 | 3/1981 | Hill | 264/75 |
| 4,444,714 | 4/1984 | Martenson | 264/78 |
| 4,484,952 | 11/1984 | Bes et al. | 264/13 |
| 4,727,117 | 2/1988 | Hallden-Abberton et al. | 525/343 |
| 4,985,187 | 1/1991 | Bes et al. | 264/13 |
| 4,988,477 | 1/1991 | Bes et al. | 264/328.18 |
| 5,236,645 | 8/1993 | Jones | 264/78 |
| 5,326,516 | 7/1994 | Brannon | 264/331.18 |

FOREIGN PATENT DOCUMENTS

| | | |
|---|---|---|
| 234889 | 2/1987 | European Pat. Off. . |
| 478987 | 9/1991 | European Pat. Off. . |

OTHER PUBLICATIONS

C. Rauwendaal, "Mixing in Polymer Processing", M. Dekker, NYC (1991), pp. 164, 176, 180, 182, and 185–187.

*Primary Examiner*—Mathieu D. Vargot
*Attorney, Agent, or Firm*—Roger K. Graham

[57] ABSTRACT

An improved process for coloring polymethacrylates or polyglutarimides in an extruder includes admixing the molten thermoplastic, conveyed directly from the polymerization operation, in an extruder mixing zone with a dispersion of at least one pigment, dye, or colorant in a suitable clear carrier, then conveying the admixed colored thermoplastic into an extrusion zone or injection molding zone.

5 Claims, No Drawings

PROCESS FOR COLORING THERMOPLASTICS

This application is a continuation of application Ser. No. 08/145,262 filed Oct. 29, 1993, now abandoned.

BACKGROUND OF THE INVENTION

Since the advent of clear moldable thermoplastics, it has been desired to prepare them in colored form, whether transparent, translucent, or opaque. Many processes exist in the art which have been evaluated to accomplish the coloration uniformly, efficiently, and cheaply. Among these exist processes for adding colorants in dry form to the molten thermoplastic, for adding colorants in dry form to a solid polymer and mixing in the molten state, and for adding colorants in solution or dispersion to a solid polymer as it is fed to an extruder for first melting and then mixing in the molten state.

It has been considered potentially cost-effective and energy-conserving if the colorant could be added to the molten matrix thermoplastic polymer as it is processed upon leaving the reactor wherein it has been prepared. Further, the method would offer much easier cleanup and color changes than when the colorant is added at the rear of the extruder, such as with the feed of pellets to be re-melted. Further, the matrix polymer would receive less thermal history and thus avoid potential degradation problems from excess heating prior to forming the final object. Further, such a process should allow better control and less variability of the colorant content, especially when low levels of colorant, such as for toning or optical brightening, are involved.

Such preparative/extrusive manufacturing processes are common for methacrylic polymers, that is, polymers with at least 80 weight percent of their units derived from methyl methacrylate, especially where the polymer is prepared by a continuous technology, unreacted monomer removed by devolatilization and recycled, and the devolatilized polymer conveyed directly to an extrusion process for forming pellets, film or sheet. Such a preparative/extrusive process is also common for polyglutarimides, wherein the molten methyl methacrylate polymer is reacted in an extruder with a primary amine, such as monomethylamine, to form the glutarimide units, optionally treated with an alkylating agent such as triethyl orthoformate or dimethyl carbonate to lower the acid and anhydride content, and then conveyed directly to an extrusion process for forming pellets, film or sheet.

However, a colorant process where the colorant is added to the molten polymer just prior to pelletization or extrudation or molding would offer similar advantages over other colorant methods, even if the polymer has been formed separately and cooled, then re-melted for coloration. For example, clear polymer of methyl methacrylate could be separately prepared in an appropriate molecular weight range and then re-melted, colored by direct colorant addition after melting, and then processed into colored melt-calendered sheet.

The difficulty with such a direct colorant-addition approach for methacrylic and glutarimide polymers is that there have been no known effective combination of colorants and non-volatile carriers known which meet the requirements for these plastics, viz., (a) compatibility with matrix polymer, as judged by visual appearance and good dispersion; (b) thermal stability in the melt, as judged by no loss of molecular weight of the matrix polymer and no discoloration of the matrix polymer; (c) no adverse effect on weathering behavior, as judged by retention of physical and appearance properties after accelerated or conventional outdoor weathering test, and (d) little or no loss in physical properties of the matrix polymer, such as heat distortion temperature.

European Unexamined Patent Application 478,987 teaches feeding of a liquid color concentrate to a polymer melt stream, mixing, and then devolatilizing to remove the carrier material. This application teaches utility for polyamides and polyesters only, not the polymers of the present invention. It further requires a devolatilization step, which is not a critical step of the present process. Indeed, the carrier in the '987 process is generally water, whereas the present invention utilizes carriers of sufficiently high boiling point that under the conditions employed for mixing and extruding, the carrier is not volatilized. Eliminating the need for devolatilization offers faster extrusion rates and less opportunity for remaining volatiles to cause poor moldings. Thus, the process described in the '987 application does not present a satisfactory solution to the problem of coloring methacrylic or glutarimide polymers in the melt directly after polymerization and/or reaction, and so avoiding the less satisfactory processes of feeding colorant prior to the polymerization or reaction, or re-melting the polymer after adding colorant to isolated pellets.

European Patent Specification 234,889 teaches that previous attempts to disperse colorant dispersions in carriers and then convey to a polymer melt have given unsatisfactory mixing, and teaches a solution to the problem wherein the colorant/carrier combination is admixed after the extrusion of the matrix melt is completed, utilizing a positive displacement feed means to form two streams of the melt and adding the colorant/dispersant into one stream. Their solution requires sophisticated equipment added externally to the end of the extruder.

We have now found that suitable non-volatile colorant carriers exist which, in combination with appropriate feeding and melt-mixing processes, will allow a wide number of colorants to be added and dispersed effectively in the "additives zone" of an extruder, with subsequent advantages in cost and ease of manufacture of colored plastics of high quality.

SUMMARY OF THE INVENTION

Thus, we have discovered a process for coloring thermoplastics in an extruder comprising:

a) conducting into an extruder mixing zone a molten thermoplastic selected from at least one of (1) a polyglutarimide or (2) a polymer containing at least 80 weight percent of units derived from methyl methacrylate;

b) admixing the molten thermoplastic in the extruder mixing zone with a dispersion of at least one pigment, dye, or colorant in a suitable clear carrier, the pigment, dye, or colorant being present at from about 0.0001 parts to about 5 parts per 100 parts of thermoplastic, the suitable clear carrier being present at from about 15 parts to about 99.9 parts per 100 parts of the dispersion, and the suitable clear carrier being present at no more than about 1 part per 100 parts of thermoplastic; and c) conducting the admixed colored thermoplastic to an extrusion die or injection molding zone.

Further, there may be added at the extruder mixing zone at least one of a lubricant, an ultraviolet stabilizer, a hindered amine light stabilizer, an anti-oxidant, a stabilizer against degradation by sterilizing radiation, or a thermal stabilizer. The admixed colored thermoplastic may be opaque or translucent, but preferably is transparent to light, that is, with a visual appearance of transparency and with a total white light transmission through a standard ASTM molded optical plaque of at least 8%. The plaque will show high transparency to those specific wave lengths of light not absorbed by the colorant.

In one aspect of our process, the admixed colored thermoplastic is then extruded through an extrusion die into strands and chopped into pellets suitable for re-molding. The dispersion of colorant may be pumped into the extruder mixing zone, and if so, the flow may be metered into the mixing zone for better consistency. With suitable pumping means, the viscosity of the dispersion may be above 20,000 cp., although the viscosity of the suitable clear colorant per se will be below about 1000 cp.

Although the colorant, dye, or pigment may be any of those known to the art for coloring thermoplastics, it is preferred for good coloration and weathering that the colorant is an anthraquinone or perinone dye. Carbon black is also useful in this process for producing gray colors. The preferred colorants cannot be added in the molten form, as they either melt too high or are chemically unstable in the melt.

DETAILED DESCRIPTION OF THE INVENTION AND PREFERRED EMBODIMENTS

A "suitable clear carrier" is defined as meeting the following criteria:

a) when admixed with the matrix polymer at up to the 1% level, no deleterious effect on the color or clarity of the resulting blend;

b) a viscosity below about 1000 cp., or an ability of the carrier to be pumped at a uniform rate into the extruder at a temperature which does not cause any turbulence or bubbles in the pumped colorant dispersion;

c) a decrease in thermal stability of the blended matrix polymer plus 0.5 weight percent of the carrier (no colorant) of no more than about 10 centigrade degrees (versus unmodified matrix polymer) as judged by TGA (thermogravimetric analysis) (conditions: heating 20° C./minute; temperature for 2% weight loss) or by a spiral flow test. In this non-standard spiral flow molding test, metering temperature is measured until all moldings of the matrix fill the 3 mm. mold without any visible decomposition of the matrix polymer, and the metering temperature of the matrix polymer plus carrier shall be no more than about 10 degrees C. lower than for the unmodified matrix polymer;

d) little decrease in accelerated weatherability stability of the blended matrix polymer plus 0.5 weight percent of the carrier (no colorant) as judged by visual appearance and lack of color shift or haze formation (SAE test method J 576) versus unmodified matrix polymer, after modified Xenon arc or EMMAQUA testing;

e) sufficiently low volatility that the blend can be extruded and molded into bubble-free objects without requiring a devolatilization step after the mixing operation.

Certain low molecular weight unsaturated polyesters (of unknown composition) are commercially available which meet the above requirements, but acceptable carriers are not limited to unsaturated polyesters. Surprisingly the unsaturated polyesters do not cross-link or cure under the mixing conditions, as demonstrated by the observation that there is essentially no effect on the melt viscosity of the blend when they are present at such low levels. Such acceptable carriers may include mineral oils, linseed oil, castor oil, epoxidized soybean oil, and aluminum or zinc stearates, any of which must meet the above criteria.

The polymer to be colored (which will be called the matrix polymer) may be a polymer of methyl methacrylate in which at least about 80% of the units are derived from methyl methacrylate. Preferred compositions for molding or extrusion into sheet are from about 89 to about 99 weight percent methyl methacrylate, the remaining monomers being a lower alkyl acrylate, such as methyl, ethyl, or butyl acrylate. Other monomers such as styrene, a-methylstyrene, vinyl toluene, vinyl acetate, acrylonitrile, maleic anhydride, and the like, may also be useful in forming the matrix polymer.

The matrix polymer also may be a polyglutarimide. Polyglutarimides, otherwise known as polymethacrylimides, are polymers which contain the unit

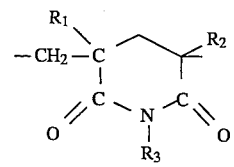

wherein $R_1$ and $R_2$ may be the same or different and are hydrogen or lower alkyl of up to four carbon atoms, such as methyl, ethyl, or butyl, and $R_3$ is H or alkyl, such as methyl, butyl, dodecyl, and the like. The polyglutarimides best known to the art are those where $R_1$ and $R_2$ are methyl and $R_3$ is hydrogen, methyl, other lower alkyl, or cyclohexyl. Particularly preferred are those polymers derived from poly(methyl methacrylate) and monomethylamine, where $R_1=R_2=R_3=$methyl. The polyglutarimide may also contain units derived from a lower alkyl or cyclohexyl methacrylate, from methacrylic acid, or of methacrylic anhydride. The matrix polyglutarimide may also be treated by an alkylating agent to lower the acid and anhydride content, preferably prepared by the method of U.S. Pat. No. 4,727,117, which patent is herein incorporated by reference. A preferred method for preparing the glutarimide is that of Kopchik, U.S. Pat. No. 4,246,374, wherein the polymer is prepared from a polymethacrylate and an amine in an extruder, and may be conveyed directly to a zone for coloring by the method of the present invention, or may be first treated with an alkylating agent, then conveyed to the mixing zone.

The term "colorant" is used herein to refer to any additive which alters the appearance of a transparent polymer with relatively little loss in light transmission or increase in haze. A dye is a colorant soluble in the matrix; a pigment is an insoluble colorant which can be well-dispersed in the matrix polymer, but may also be used when at a larger particle size to introduce controlled translucency or opacity into the thermoplastic matrix polymer. Titanium dioxide is an example of an opacifying pigment. Optical brighteners also are examples of such "colorants". The colorants themselves are not novel, having been used in blends with methyl methacrylate polymers, but admixed by other methods.

The colorant, dye, or pigment is normally separately dispersed in the suitable clear carrier by a process such as high-shear mixing. The mixing may optionally be carried out with heating (to hasten dissolution or dispersion), or with cooling (to keep from overheating the carrier due to heat imparted by high-shear mixing. Other mixing methods, such as a 3-roll mill, a pebble mill. a steel ball mill, or a horizontal or vertical media mill, may also be employed.

The level of the pigment, dye, or colorant is normally from about 0.0001 parts to about 5 parts per 100 parts of thermoplastic, and the suitable clear carrier is normally present at from about 15 parts to about 99.9 parts per 100 parts of the dispersion; however, under certain conditions, higher or lower levels of both colorant and carrier may be employed, such as when a very low level of colorant for use as a toner is desired. The dispersion will normally be added to the melt at the extruder mixing zone by a pumping process, and a metering device may be present to assure constant flow. The dispersion may be heated to reduce its viscosity while pumping, but usually it is preferred to add it at about room temperature to avoid over-heating in the mixing zone. The suitable clear carrier should be present at no more than about 1 part per 100 parts of thermoplastic to avoid plasticization of the matrix polymer.

The extruder configuration at the melt-mixing zone may be any of a conventional type used for admixing of plastics. However, because it has been found advantageous in the manufacture of polymethacrylates and polyglutarimides to conduct (a) the devolatilization of the methacrylate polymer with recycle of monomer or (b) the imidization and acid-reduction process of the formation of the polyglutarimide in a twin-screw extruder, such twin-screw extruders are preferred. The twin-screw extruder may be of the co-rotating or contra-rotating variety, and the screws may be tangential or slightly separated.

Good mixing of the colorant dispersion into the melt is required. Such mixing can be accomplished with a mixing screw design, preferably involving a paddle configuration, which is suitable for dispersant of other additives, such as lubricants, fed in a molten form. Inadequate mixing, such as by lowering the number of mixing paddles, will result in surging problems due to the presence of two separate phases in the melt.

Other mixing methods known to the art may be applied in the mixing; many of these are taught in C. Rauwendaal, "Mixing in Polymer Processing", M. Dekker, NYC (1991). Thus, cavity mixers, slotted flight mixers, blister rings, and the like may be employed, with configurations such as taught in Rauwendaal on pages 164, 176, 180, 182, and 185–7. It will take limited experimentation by one of ordinary skill in mixing solid additives into the molten matrix polymer to determine whether adequate extrduer mixing of the colorant/carrier blend is occurring.

Other additives may be compounded essentially simultaneously with the coloring dispersion. Normally such additives are melted and conveyed to the mixing zone of the extruder. It is preferred that two entrance ports be present, one for the coloring dispersion and one for the other additives, for ease in cleaning and for ease in conversion to production of non-colored materials. Such additives will usually be present at levels of from about 0.1 parts to about 2 parts based on 100 parts of the thermoplastic polymer. One or more additives may be present. Such types of additives include a lubricant, such as a long-chain aliphatic alcohol, a long-chain fatty acid, an amide of a long-chain fatty acid, or an ester of a long-chain fatty acid, and the like; an ultraviolet stabilizer, such as a benzotriazole, a salicylate ester, a cyanoacrylate, and the like; a hindered amine light stabilizer, such as a derivative of 1,1,6,6-tetramethylpiperidine; a stabilizer against degradation by sterilizing radiation, such as butyl lactate; or a thermal stabilizer, such as an organic phosphite, a thioester, and the like. For certain end uses, chemicals which are near infra-red absorbers may also be added at this point.

The polymers so colored may be directly conveyed to a molding apparatus or to a sheet or film extruder. Usually, they are extruded through a die into strands and chopped into pellets suitable for re-molding. The pellets, if of suitably high molecular weight, may be re-extruded into sheet or film, such as by a melt calendering process.

The polymers so colored are useful in many applications where the good weathering, clarity, and high heat distortion of the basic matrix polymer is desirable. Such applications include automotive lighting parts, such as tail-light lenses, head-light lenses and housings, glazing, and the like; also lenses, windows, protective coverings, sky-lights, appliance parts, and the like.

EXAMPLES

Example 1

Coloring of a Polyglutarimide

A polymer containing ca. 76 weight percent of N-methyl dimethylglutarimide units, below 0.5% of combined acid and anhydride units, the remainder being units derived from methyl methacrylate, is prepared by the method of U.S. Pat. No. 4,727,117, from a polymer of methyl methacrylate of MW ca. 150,000 weight-average and monomethylamine, followed by alkylation with dimethyl carbonate. The molten polymer, at a melt feed rate of 165 grams/minute and a melt temperature of 280° C. to 310 ° C., is conveyed in a twin-screw contra-rotating, tangential extruder of screw outer diameter 0.80 inches ( 20.32 mm.), barrel diameter 0.812 inches (20.62 mm.), after passing a final devolatilization zone, to a mixing zone.

At this zone, the main screw has four mixing paddles which are 0.3 inches (7.62 mm) long, and three paddles on an auxiliary screw used to feed the additives. The paddles have a perpendicular flat face at the surface in the direction of the screw rotation. Each paddle has eight segments spaced around the screw, the second set of segments being off-spaced by 22.5 degrees from the first. At this point, the screw root is enlarged to ca. 0.8 in (20.32 mm.) in diameter, and the height of the paddles is ca. 0.11 inches (2.79 mm.).

A mixture of equal parts of the colorant perinone pigment known as Solvent Red 135 (Chem. Abstr. #4612-023-8) and of polyester carrier, a viscous yellow liquid (ca. 550 cp.) described as an unsaturated polyester by the supplier, is prepared externally with a high-shear, high-speed mixer until a unform dispersion was judged by eye to have been achieved. The blend could then be passed through a heat-exchanger so it could be fed hot, but in the present experiments, a heat exchanger is not used. The mix is fed to the additives conveyer at a rate to add 0.5 weight % of carrier to the polymer. The dispersion of colorant and carrier is added to the main polymer melt at the mixing zone, and the well-mixed molten polymer then conveyed through a pelletizing die and into a water bath.

When compared to a polymer of similar composition produced without colorant and the colorant then being admixed in a dry form and the polymer re-extruded to obtain uniformity, the consistency of coloring is equivalent. Accelerated weathering results are similar for both polymers. The heat distortion temperature is decreased by about 1° C., and the thermal stability decreased (measured by TGA) by about 8° C. relative to the uncolored product or the product colored with dry colorants. Commercially acceptable product can be prepared with a polymer exhibiting these slight decreases.

Example 2

Study of the Dispersing of Colors

The polyester carrier from Example 1 is separately shown by blending experiments in an extruder to be compatible with both the polyglutarimide of Example 1 and with commercial "acrylic" molding powders of MW ca. 120,000 and containing 90 to 99 weight percent methyl methacrylate. Separately it is shown that stable uniform dispersions of many commercial colorants, dyes, and pigments may be prepared by admixture with various ratios of the carrier unsaturated polyester.

Example 3

Addition of Other Additives

The process of Example 1 is followed. The port where the colorant/carrier mixture is introduced leads to a molten pumped stream of stearyl alcohol (0.3 weight % on polymer) and 2-(2-hydroxy-5-t-octylphenyl)benzotriazole ultraviolet stabilizer (0.25% on polymer). The co-mixed stream is then fed to the mixing zone of the extruder as in Example 1. The resulting polyglutarimide will have acceptable molding characteristics similar to an uncolored polyglutarimide so lubricated with stearyl alcohol and stabilized, and the coloring behavior will be similar to the polymer of Example 1.

Example 4

Other Colorants

In a manner similar to Example 3, are prepared the following:

a) mixture of dye and carrier as in Example 1, but fed at a rate to add 0.50 lbs. colorant plus carrier to 100 lbs. of matrix polymer;

b) a mixture of carbon black (ca. 10% of blend) and polyester fed at a rate to add 0.10 lbs. colorant plus carrier to 100 lbs. of matrix polymer.

Example 5

Use of the Process with Poly(methyl methacrylate)

A polymer of methyl methacrylate 97/ethyl acrylate 3 is prepared in a CFSTR at a temperature of ca. 160° C.–180° C. to about 50–60% conversion in the presence of ca. 0.2% n-dodecyl mercaptan and of ca. 100–300 ppm of a polymerization initiator known to be effective in that temperature range, such as di-t-butyl peroxide, di-t-amyl peroxide, t-butyl peracetate, t-butyl peroctoate, 2,5-dimethyl-2,5-di(t-butylperoxy)hexane, dicumyl peroxide, di-(t-amylcyclohexanone ketal) peroxide, methyl ethyl ketone peroxide; t-butyl perbenzoate; and the like; mercaptan and initiator are added with the monomer charge. The molten polymer is then devolatilized and conveyed at a melt temperature of 260° C. to 290° C. and a rate of 120–150 grams/minute to the mixing zone of an extruder equipped as in Example 1. A mixture similar to that prepared in Example 1 of colorant and carrier is fed to the polymer melt. Colorant feed rates are adjusted downward to obtain the same concentration of the colorant in the matrix polymer. The resulting polymer is anticipated to exhibit good consistency and color behavior.

Example 6

Use of the Process of Claim 3 on Larger Equipment

Similar results will be obtained when the reaction equipment is of similar design but larger. In the present case the barrels are 4.5 inches (114.3 mm.) in diameter, the melt feed rate is 2400 lbs. (1091 kg.) hour, and a melt pump is placed in the system after the mixing zone to aid conveyance to the pelletizing die.

Example 7

Illustration of Coloring of Reprocessed Polymer

A polymer is prepared in as manner similar to that of Example 5, but the melt is conveyed directly through any extruder mixing zone without addition of colorant dispersion. The extrudate is stranded, cooled by a water batch and chopped into pellets. The resulting pellets are then added to the feed hopper of a single-screw extruder equipped with an extruder mixing zone, means for feeding a colorant dispersion to the extruder mixing zone, and a sheet die producing 50 mil (1.27 mm) sheet. A colorant dispersion similar to that used in Example 5 is added to the molten polymer at the extruder mixing zone, and the colored polymer extruded through an appropriate sheet die into sheet, which is anticipated to be of uniform color.

We claim:

1. A process for coloring thermoplastics in an extruder comprising:

a) conducting into a mixing zone of the extruder a molten thermoplastic selected from at least one of (1) a polyglutarimide or (2) a polymer containing at least 80 weight percent of units derived from methyl methacrylate;

b) admixing the molten thermoplastic in the mixing zone of the extruder with a dispersion consisting essentially of at least one pigment, dye, or colorant in a suitable non-aqueous, non-volatile, non-plasticizing, clear carrier, the pigment, dye, or colorant being present at from about 0.0001 parts to about 5 parts per 100 parts of thermoplastic, the suitable non-aqueous, non-volatile non-plasticizing, clear carrier being present at from about 15 parts to about 99.9 parts per 100 parts of the dispersion, and the suitable non-aqueous, non-volatile, non-plasticizing, clear carrier being present at no more than about 1 part per 100 parts of thermoplastic; and c) conducting the admixed colored thermoplastic into an extrusion zone or injection molding zone.

2. The process of claim 1 where the suitable clear carrier is an unsaturated polyester of viscosity at room temperature below 1000 cp.

3. The process of claim 1 wherein further at the extruder mixing zone are added at least one of a lubricant, an ultraviolet stabilizer, a hindered amine light stabilizer, an anti-oxidant, a stabilizer against degradation by sterilizing radiation, or a thermal stabilizer.

4. The process of claim 1 wherein the colorant is an anthraquinone or perinone dye.

5. The process of claim 1 wherein the colorant contains carbon black.

* * * * *